(12) United States Patent
Queveau et al.

(10) Patent No.: US 7,237,837 B2
(45) Date of Patent: Jul. 3, 2007

(54) CONVERTIBLE CAR SEAT

(75) Inventors: Gérard Queveau, Le Pin (FR); Paul Queveau, Montravers (FR); Frédéric Leclerre, Chartres (FR)

(73) Assignee: Heuliez, Cerizay (FR)

( * ) Notice: Subject to any disclaimer, the term of this patent is extended or adjusted under 35 U.S.C. 154(b) by 0 days.

(21) Appl. No.: 11/148,645

(22) Filed: Jun. 9, 2005

(65) Prior Publication Data

US 2006/0103174 A1 May 18, 2006

(30) Foreign Application Priority Data

Jun. 9, 2004 (FR) .................................. 04 51143
Nov. 9, 2004 (FR) .................................. 04 52565

(51) Int. Cl.
*B60N 2/36* (2006.01)
(52) U.S. Cl. ........................................................ 297/15
(58) Field of Classification Search .................... 297/15
See application file for complete search history.

(56) References Cited

U.S. PATENT DOCUMENTS

| | | | |
|---|---|---|---|
| 6,183,032 B1 | 2/2001 | Champ | 296/65.03 |
| 6,199,951 B1 | 3/2001 | Zeile et al. | 297/341 |
| 6,540,295 B1 | 4/2003 | Saberan et al. | 297/344.21 |
| 6,629,721 B1 * | 10/2003 | Macey | 297/15 |
| 7,077,463 B2 * | 7/2006 | Sun et al. | 297/15 |
| 2002/0017797 A1 | 2/2002 | Jach et al. | 296/65.09 |
| 2002/0067056 A1 | 6/2002 | Garrido et al. | 297/15 |
| 2004/0100114 A1 | 5/2004 | Rhodes et al. | 296/65.09 |
| 2004/0100117 A1 | 5/2004 | Rhodes et al. | 296/66 |

FOREIGN PATENT DOCUMENTS

| | | |
|---|---|---|
| DE | 100 64 793 A1 | 6/2002 |
| DE | 102 39 112 A1 | 3/2004 |
| GB | 2 380 933 A | 8/2002 |
| WO | WO 03/008230 A1 | 1/2003 |
| WO | WO 03/026919 A1 | 4/2003 |

* cited by examiner

*Primary Examiner*—Rodney B White
(74) *Attorney, Agent, or Firm*—Nawrocki, Rooney & Sivertson, P.A.

(57) ABSTRACT

A convertible car seat that can take on a variety of configurations. These include seat, shelf, document case and flat configurations. The convertible seat is made up of two surfaces, one of a seat and one of a backrest. These are supported by two frames which are symmetrical with respect to a horizontal frame. The frames are made of rigid elements. The elements are connected by joints at each end to create a unit of four axles which permit folding the rigid elements to various configurations.

16 Claims, 11 Drawing Sheets

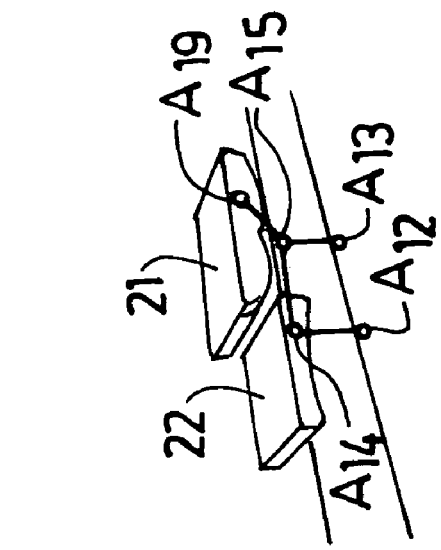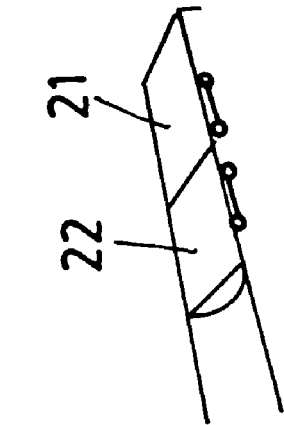
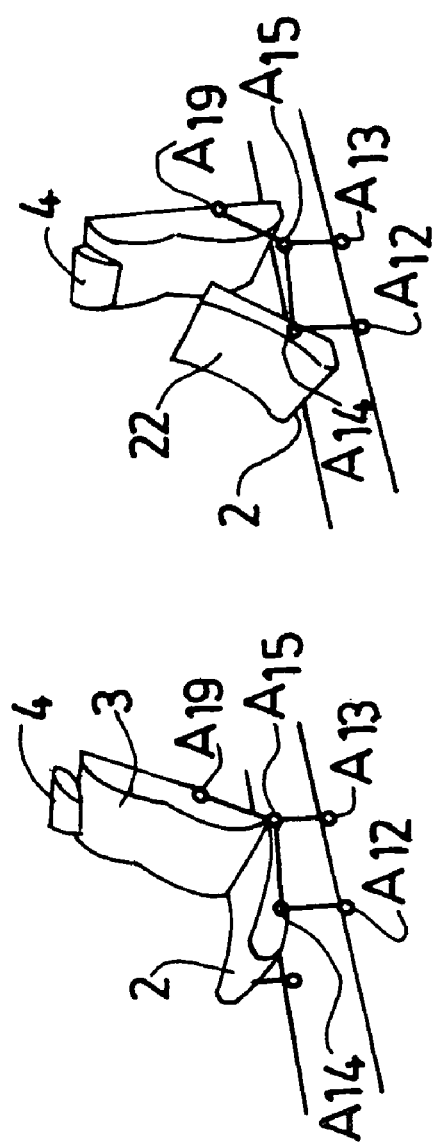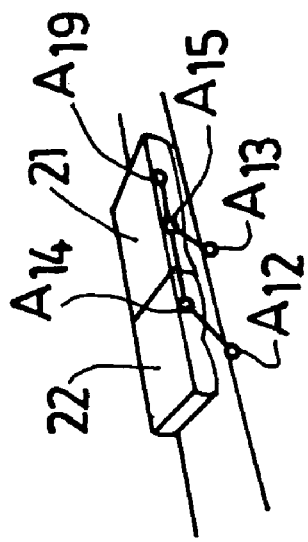
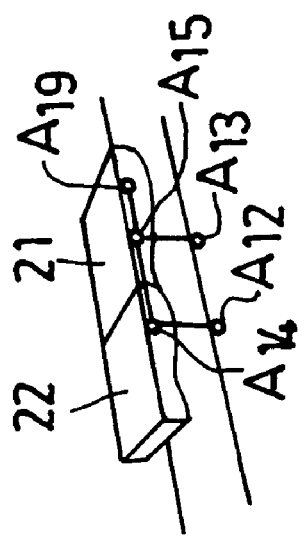
FIG.4a  FIG.4b  FIG.4c
FIG.4d  FIG.4e  FIG.4f

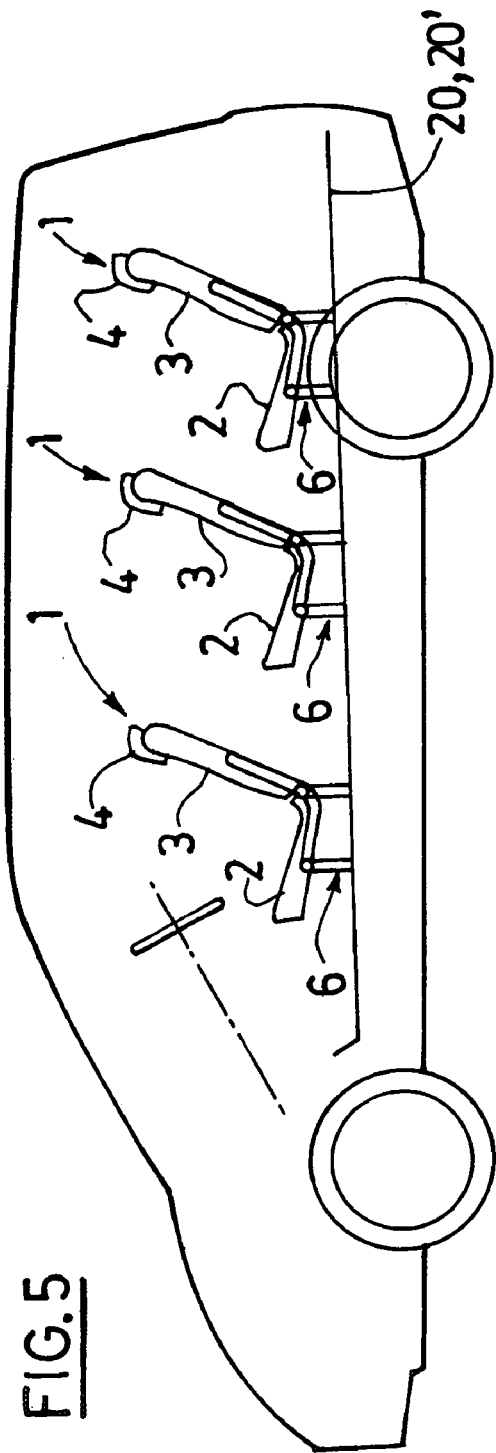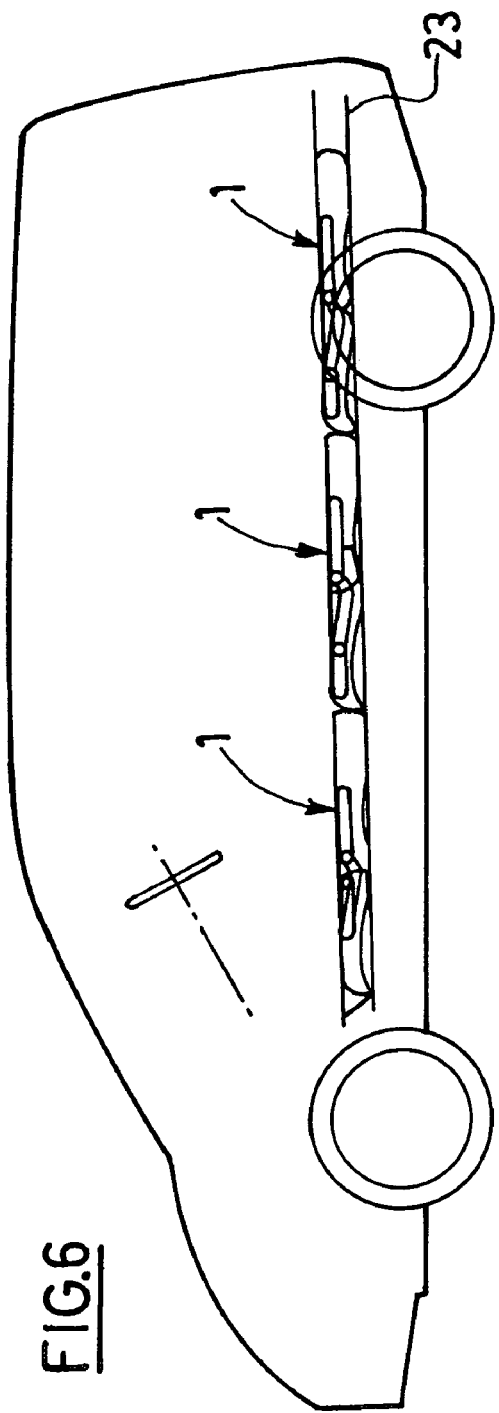

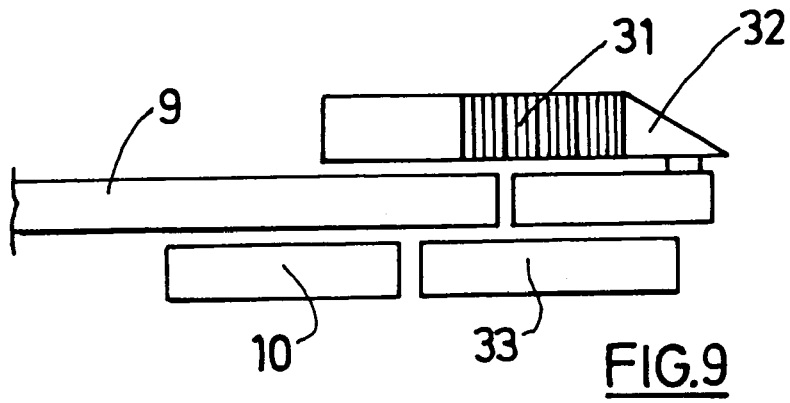
FIG.9
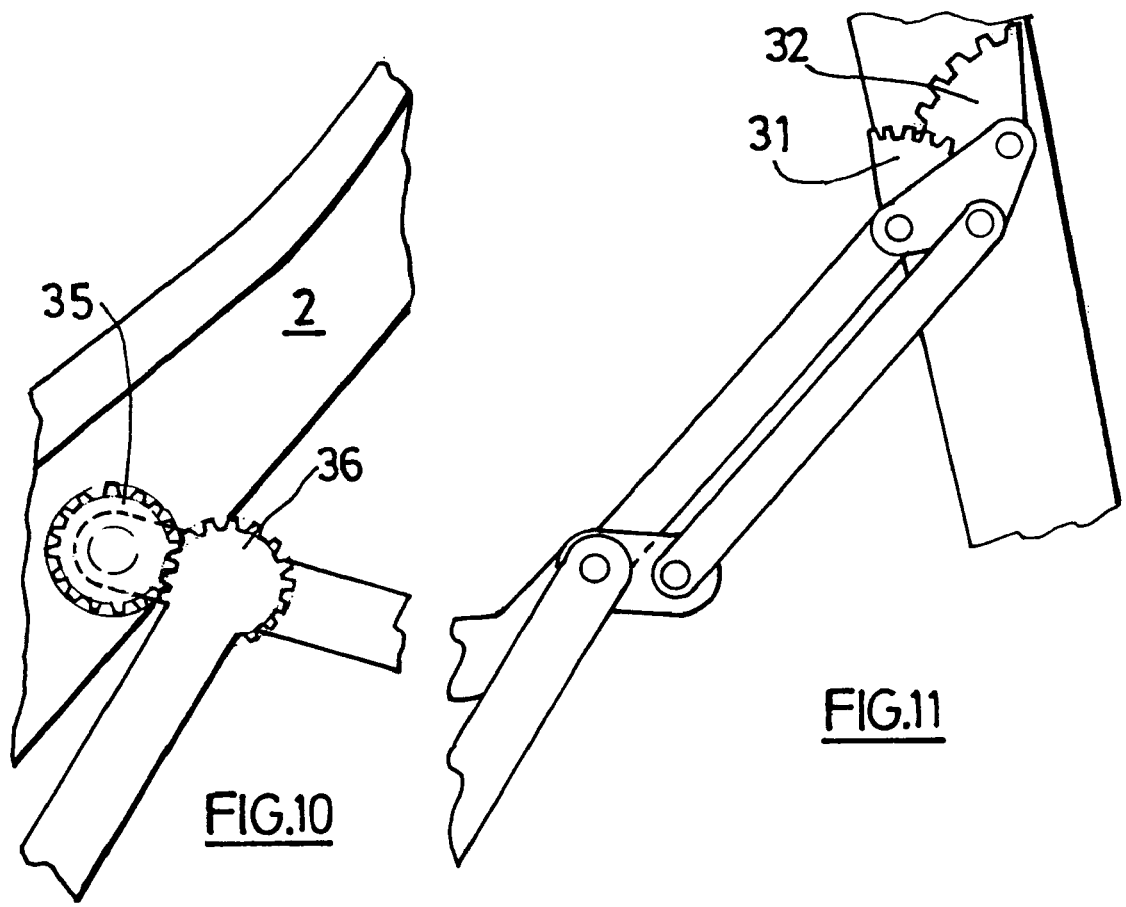
FIG.10
FIG.11
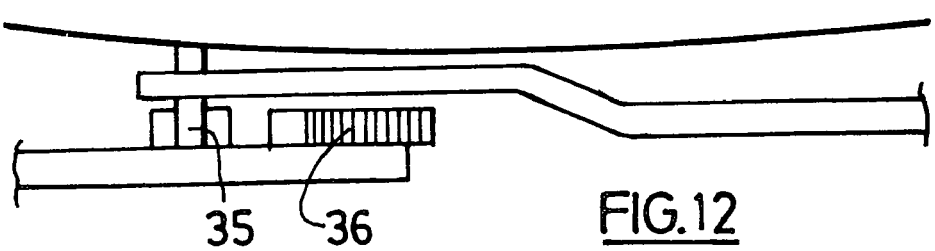
FIG.12

CONVERTIBLE CAR SEAT

CROSS-REFERENCE TO RELATED APPLICATIONS

This application claims priority of French Patent Application No. 0451143 filed on Jun. 9, 2004 and French Patent Application No. 0452565 filed on Nov. 9, 2004.

BACKGROUND OF THE INVENTION

The invention relates to a convertible car seat that can take on various configurations, as well as a vehicle that includes such a seat and a method for transforming the seat.

Vehicle seats are already known that can take on various configurations, for instance, going from a configuration that allows them to be used as seats, to retracted configurations that increase the length of the rear boot.

One of the problems to be solved when designing these seats is to simplify the change from one configuration to the next for the future user.

Moreover, it is desirable for a single seat to be able to assume various configurations, in order to be able to be used for different functions inside the vehicle's passenger compartment. Particularly in the case of minivan-type vehicles, it is important to be able to modulate the interior space to adapt for example to the number of passengers or the type of objects that need to be transported.

SUMMARY OF THE INVENTION

For this purpose, and according to the first aspect, the invention provides a convertible car seat that can take on several configurations such as seat, shelf, document case, flat, comprising the following:
  a seating surface and a backrest, both of which run substantially perpendicular to a longitudinal plane;
  a support made up of two frames, which are symmetrical with respect to the longitudinal plane, each of which has a quadrilateral shape, placed on either side of the seating surface, on planes substantially parallel to the longitudinal plane. The sides of such frames are made up of rigid elements, at least one of which is located on an almost horizontal plane, with the opposite rigid element located on one of the sides of the seating surface. Such rigid elements are connected to each other by means of joints placed at each of their ends on an axle that therefore creates a unit of four axles that are substantially parallel to each other, in such a way that the support is able to fold by the rigid elements pivoting around the axles in the manner of a flexible quadrilateral. These axles are made up of the following when the convertible seat is in seat configuration:
  a first axle that connects the rigid elements located in front of the seat to the substantially horizontal rigid elements,
  a second axle that connects the rigid elements located to the rear of the seat to the substantially horizontal rigid elements,
  a third axle and a fourth axle that connect the rigid elements located in front of the seat and to the rear of the seat respectively to the rigid elements located on either side of the seating surface, in which,
    at least one of the joints of the rigid elements can be locked in order to lock the support in a given position
  the seating surface is mounted and lockably connected to the mentioned third axle,
  arms are placed on either side of the seat, on the longitudinal plane, with the first end of the arm lockably connected to the mentioned fourth axle,
  the backrest is mounted on the second end of the mentioned arms, by means of at least one lockable joint, thus forming a fifth axle which is substantially parallel to the other axles, in order for unlocking of one or several of the lockable axles to enable the support, the seating surface, the arms and the backrest to be placed in various positions and for locking of the mentioned lockable joint or joints to enable the support, the seating surface, the arms and the backrest of the seat to be fixed in a given configuration.

In a specific embodiment of the invention, the seat that is the object of the invention includes a first rod which is substantially an extension of at least one of the mentioned rigid elements located to the rear of the seat. On its open end, such rod includes a first cogwheel which is arranged to work with a second cogwheel mounted on the fifth axle, formed integral with the backrest, with a third cogwheel mounted on the third axle, which is formed integral with the seat and designed to work with a fourth cogwheel mounted on the end of the relevant rigid element located in front of the seat. A second rod is connected to the backrest of the seat and to the rigid element located on the relevant side of the seating surface in order to form a quadrilateral that can be folded using the mentioned first rod.

According to a second aspect, the invention provides a vehicle that includes at least one such seat.

According to a third aspect, the invention provides a method for transforming such a convertible seat to one of the seat, shelf, document case and flat configurations, which includes the successive steps of unlocking one or several of the lockable joints, repositioning the seating surface and/or the backrest, and locking the mentioned lockable joint or joints.

BRIEF DESCRIPTION OF THE DRAWINGS

Other objectives and advantages of the invention will become more apparent from the following description, made in reference to the appended drawings, in which:

FIGS. 4a to 4f show the successive steps required to transform such a seat from its seat configuration to its flat configuration (FIGS. 4d and 4e) and then to its fold-away flat configuration (FIG. 4f);

FIG. 5 is a schematic side view of a minivan-type vehicle, showing the inside of the passenger compartment fitted with the seats that are the object of the invention in their seat configuration;

FIG. 6 is the same view as FIG. 5 but with the seats shown in fold-away flat configuration in the floor of the vehicle;

FIGS. 9 to 12 are detail side (FIGS. 10 and 11) and top (FIGS. 9 and 12) views on a larger scale;

FIGS. 13b, 14b and 15b are top views that match FIGS. 13a, 14a and 15a.

DETAILED DESCRIPTION OF THE INVENTION

The following is a description of a convertible car seat 1 that can take on various configurations as shown in FIGS. 1 to 6. It can be used as a traditional seat, with the seating surface 2 and the backrest 3 substantially perpendicular to each other in this seat configuration. It can also assume a so-called "shelf" configuration, allowing objects to be placed on top of it, a so-called "document case" configuration, in which the seating surface 2 is folded up against the backrest 3, in order to form a unit that runs along a substantially vertical plane, or even a flat configuration, in which the seating surface 2 and the backrest 3 are laid out as an extension of one another, and run along a substantially horizontal plane.

Figure 1:
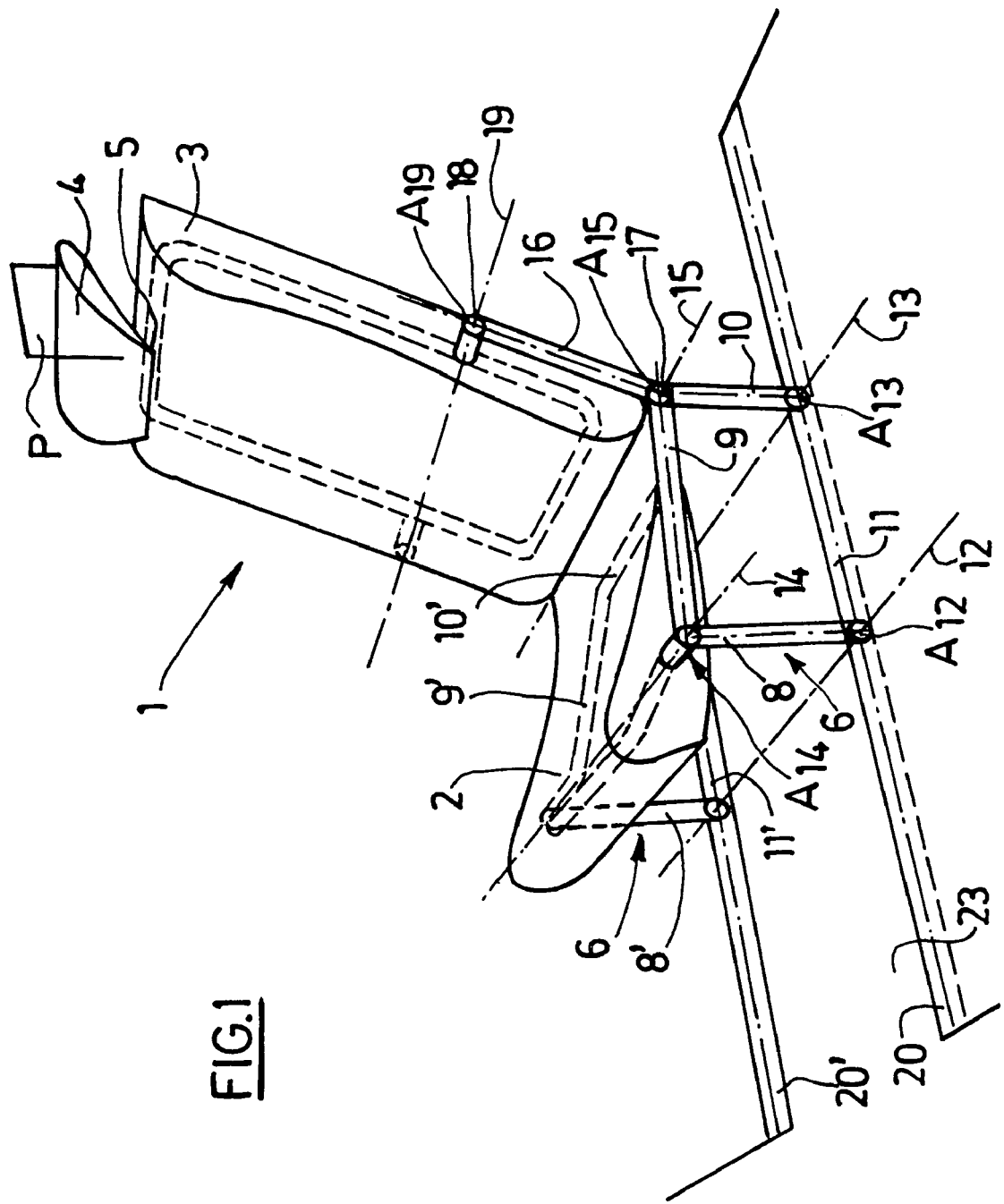
FIG. 1 is a schematic perspective view of a convertible seat according to the invention, attached to the floor of the passenger compartment of a car.

In all these configurations, the seating surface 2 and the backrest 3 both run substantially perpendicular to the longitudinal plane, which is marked by the letter P in FIG. 1.

In the rest of the description, "longitudinal" means the direction that is generally parallel to the seat's plane of symmetry, and "transversal" means direction that is generally perpendicular to the seat's plane of symmetry, when it is in its "seat" configuration. Also, "front" and "rear" respectively mean the direction which the seat's occupant is facing in "seat" configuration, and the opposite direction.

The seat 1 can include, as shown in FIGS. 1, 4, 5 and 6 a removable headrest 4 located on the top side of the backrest 3.

The seat 1 also includes a support made up of two frames 6 that are symmetrical with respect to the longitudinal plane P, placed on either side of the seating surface 2, along planes that are substantially parallel to the plane P. Each frame 6 has a general quadrilateral shape, and is made up of four rigid rod-type elements 8, 9, 10, 11, 8', 9', 10', 11', connected to each other at the ends. At least one of such elements 11, 11' is located on an almost horizontal plane, with the opposite rigid element 9, 9' located on one of the sides of the seat 2.

The rigid elements 8, 9, 10, 11, 8', 9', 10', 11' are connected to each other by means of joints A12, A13, A14, A15, placed at each of their ends, thus forming a set of four axles 12, 13, 14, 15 substantially parallel to each other, in such a way that the support can be folded by pivoting the rigid elements 8, 9, 10, 11, 8', 9', 10', 11' around these axles in the manner of a foldable quadrilateral, with this folding of the support contributing to the transformation of the seat in its various configurations.

When the convertible seat 1 is in its seat configuration (see FIG. 1 in particular), the axles comprise:

a first axle 12 connecting the rigid elements 8, 8' located in front of the seat, elements 8, 8' that run substantially vertically, to the substantially horizontal rigid elements 11, 11', which are placed on the floor of the passenger compartment of the vehicle in which the seat 1 is mounted;

a second axle 13 connecting the rigid elements 10, 10' located to the rear of the seat, and which run substantially vertically, to the substantially horizontal rigid elements 11, 11';

a third axle 14 and a fourth axle 15 respectively connecting the rigid elements 8, 8' located in front of the seat and the rigid elements 10, 10' at the rear of the seat to the rigid elements 9, 9' located on either side of the seating surface 2, both of which run, on one of the sides of seating surface 2, from the front to the back of the latter.

In this seat 1, at least one of the joints A12, A13, A14, A15 that connect the rigid elements 8, 9, 10, 11, 8', 9', 10', 11' to each other is lockable, with the aim of being able to lock the support in a given position.

Furthermore, the seat 2 is mounted lockably connected to the third axle 14, which runs transversally, to the front of the mentioned seating surface 2.

On the side of the backrest 3, an arm 16 is placed on either side of the seat, with each arm 16 located on a longitudinal plane, a first end 17 of the arm 16, in a lower position in the seat configuration shown in FIG. 1, being lockably connected to the fourth axle 15.

As for the backrest 3, it is mounted on the second end 18 of such arms 16, in a higher position in the seat configuration shown in FIG. 1, by at least one lockable joint A19, thus forming a fifth axle 19 which runs transversally and substantially parallel to the other four axles 12, 13, 14, 15.

In this way, unlocking one or several of the lockable joints A12, A13, A14, A15, A19 makes it possible to place the support made up of the frames 6, the seating surface 2, the arms 16 and the backrest 3 in various positions, and locking one or several of the lockable joints A12, A13, A14, A15, A19 makes it possible to fix these various elements, namely the support, the seating surface 2, the arms 16 and the backrest 3 in a given configuration of the convertible seat.

Such a structure has the advantage of being straightforward and easy to assemble, since all the axles are parallel to each other, and the rigid elements are placed symmetrically on either side of the seat.

Moreover, to reduce the manufacturing costs of such a seat, identical components can be used for the various elements of the seat, such as the rigid elements 8, 9, 10, 11, 8', 9', 10', 11' or the lockable joints A12, A13, A14, A15, A19.

In addition, the use of joints makes it possible to accurately control the oil clearance and to withstand considerable mechanical stress, which makes it possible in turn to guarantee optimum precision in the positioning of the seat and the backrest. Moreover, these kinds of joints can be easily motorised.

As shown in FIGS. 1, 5 and 6, the rigid elements 11, 11' located on the horizontal plane can be guided along parallel longitudinal rails 20, 20', located in the floor of the passenger compartment of the vehicle, which allows the convertible seat 1 to move along such rails 20, 20', and which also make it possible to plan that at least one of the joints A12, A13 located on the horizontal plane should be lockable on the relevant rail 20, 20'. The mentioned rigid elements 11, 11' can be built into the sliding elements that form the rails or placed outside of such sliding elements.

This layout further increases the adaptable and modular nature of the seat mounted in the passenger compartment of a vehicle.

In order to rigidify the seat 1, the fourth axle 15 also includes means that make it possible to releasably hook the rear of the seating surface 2 and the bottom of the backrest 3 to the mentioned axle 15.

To further simplify the structure of the seat, we can plan as regards the seating surface 2, that at least one of the lockable joints of the rigid elements should be combined with the lockable joint A14 of the seat.

In addition, the locking/unlocking of at least the joints A15, A19 from the first 17 and second 18 ends of the arms 16 can be coordinated. Thus, with a single command, it is possible to control the unlocking of these joints, to allow for the backrest to swing into the desired position, and then to control the locking in order to block the backrest in this position.

In particular, it can be planned for specific means to be implemented to make the movements of the backrest 3 and the arms 16 interdependent. These means can be mechanical or electromechanical, such as, for example, chains, gears or rails. Such means are laid out in order to make the rotation of the backrest 3 around the axle 19 and the rotation of the arms 16 around the axle 15 interdependent. Thus, by means of coordinating these movements, the backrest 3 can follow a given path, a path which can be adapted to the outline of the passenger compartment in which the seat 1 is mounted, and can also provide optimum manipulation ergonomics.

The following is a description of the method to transform such a convertible seat to its various configurations. This method generally comprises the successive steps of unlocking one or several of the lockable joints, repositioning the seating surface 2 and/or the backrest 3 in a position that is compatible with the desired configuration, and locking the mentioned lockable joint or joints.

As regards FIG. 2, we will describe the method for transforming the convertible seat 1 from its seat configuration to its shelf configuration.

Figure 2A:
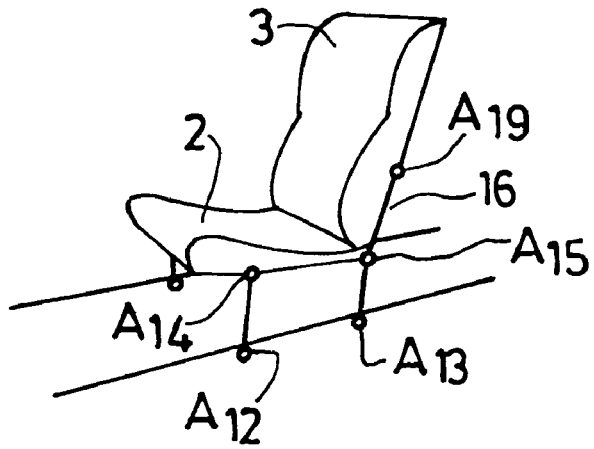
FIGS. 2a to 2d show the successive steps required to transform such a seat from its seat configuration to its shelf configuration.
Figure 2B:
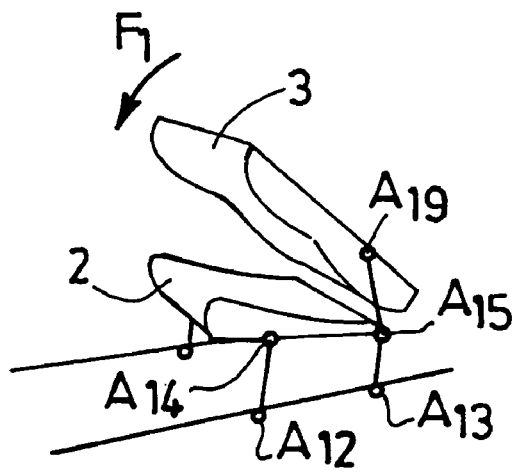
Figure 2C:
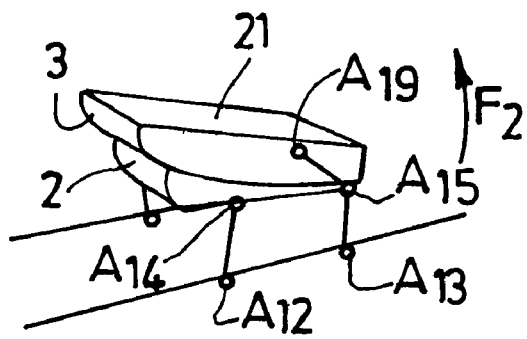

The seat configuration is shown schematically in FIG. 2a. Starting with this configuration, it is initially necessary to unlock the joints A15, A19 located on the fourth 15 and fifth 19 axles in order to release the backrest 3 and then, as shown in FIG. 2b, to pivot the backrest 3 and the arms 16 around the fifth 19 and fourth 15 axles respectively towards the front of the vehicle (in the direction shown by the arrow F1). The backrest 3 is then positioned on top of the seat 2, the non-flat shape of the top side of the seat 2 implying that the backrest 3 runs at a certain angle with respect to the horizontal plane (see FIG. 2c).

Figure 2D:
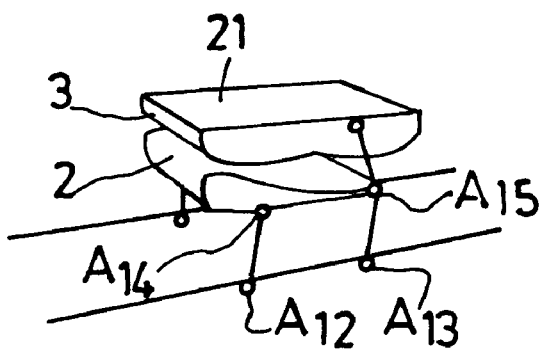

In order to reach the shelf configuration, in which it is necessary for the back 21 of the backrest 3 to be horizontal, the arms 16 are made to pivot around the fourth axle 15, towards the rear of the vehicle, which makes it possible to move the backrest 3 slightly backwards while raising its rear end (see the arrow F2). Thus, as shown in FIG. 2d, the backrest 3 is positioned substantially parallel to the seating surface 2, at a certain distance from the latter, and with the back 21 of the backrest 3 running along the horizontal plane. It is then necessary to lock the joints A15, A19 located on the fourth 15 and fifth 19 axles, in order to be able to use the seat 1 as a shelf.

Thus, for this transformation, it is not necessary to modify the position of the support or, consequently, the position of the seat's seating surface 2.

Figure 3A:
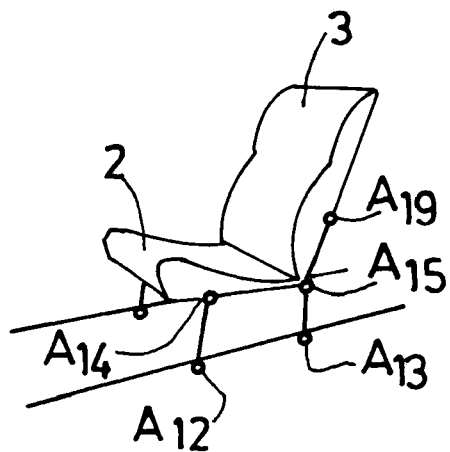
FIGS. 3a to 3d show the successive steps required to transform such a seat from its seat configuration to its document case configuration.
Figure 3B:
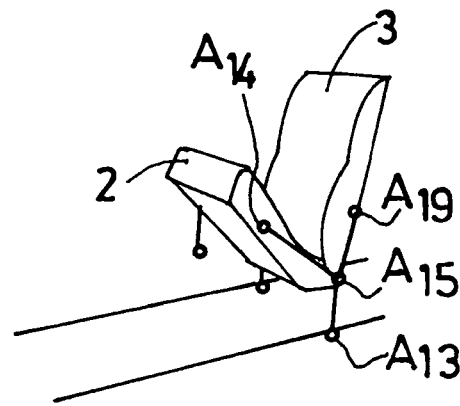
Figure 3C:
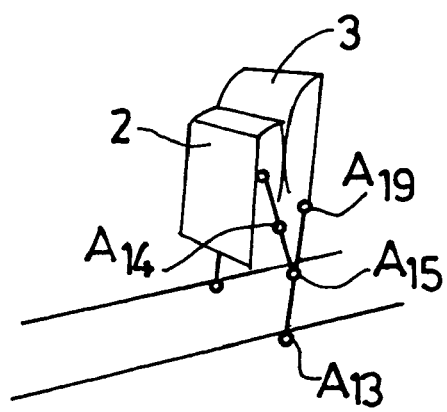
Figure 3D:
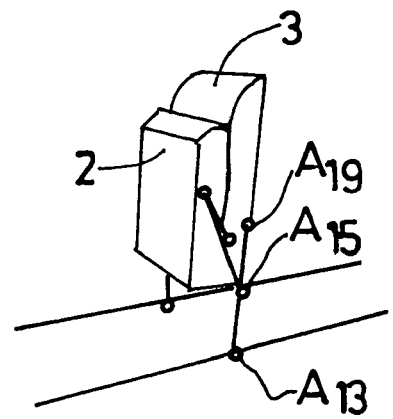

FIGS. 3a to 3d show the steps required to transform the seat 1 from its seat configuration (FIG. 3a) to its document case configuration (FIG. 3d). To do this, the joints A14, A15 located on the third 14 and fourth 15 axles are unlocked, in order to release the seat 2. Then, the front rigid elements 8, 8' are detached from the substantially horizontal rigid elements 11, 11' (FIG. 3b). It is then possible to lift the seating surface 2 towards the rear, by making it pivot around the fourth axle 15, until it is positioned substantially vertical, and close to the backrest 3 (FIG. 3c). Then, the joints A14, A15, located on the third 14 and fourth 15 axles respectively, are locked in order to reach the document case configuration shown in FIG. 3d. This configuration allows for a considerable amount of space to be saved inside the passenger compartment of the vehicle.

FIGS. 4a to 4f show the steps required to transform the seat 1 from the seat configuration (FIG. 4a) to the fold-away flat configuration (FIG. 4f). This transformation implies first passing through the flat configuration (FIG. 4d).

For this purpose, the joints A14, A15, located on the third 14 and fourth 15 axles respectively, are unlocked, and the seat 2 is then made to pivot through 180° towards the front of the vehicle, around the third axle 14 (FIG. 4b). Thus, the bottom face 22—or back—of the seat, in seat configuration, becomes the top face, while remaining in the same horizontal position.

The next step is to pivot the backrest 3 towards the front, and the arms 16 around the fifth 19 and fourth 15 axles respectively, in order for the backrest 3 to become positioned gradually as an extension of the seating surface 2 (FIG. 4c). In the event that the seat 1 includes a headrest 4, such as shown in the figure, it is necessary to remove this headrest 4 from the backrest 3 prior to pivoting the mentioned backrest, in order for the headrest 4 not to block the positioning of the backrest 3 with respect to the seat 2.

Then, since the back 22 of the seating surface 2 and the back 21 of the backrest 3 are in the same horizontal plane (FIG. 4d), the joints A14, A15, A19 located on the third 14, fourth 15 and fifth 19 axles respectively are locked in order to fix the seat 1 in its flat or "high" configuration, in which the frames 6 that make up the support, open out upwards.

As mentioned previously, it is then possible to move the seat 1 into the fold-away flat or "low" position, in which the frames 6 that make up the support are folded downwards. To do so, starting from the "high" flat position, it is necessary to unlock at least one of the joints of the rigid elements, in order to be able to fold the frames 6 by folding them downwards, for example, towards the rear of the vehicle (FIG. 4e). Then, once the lowest position has been reached, the aforementioned joint or joints of the rigid elements that was unlocked previously are locked back in place.

FIGS. 5 and 6 are schematic representations of a minivan-type vehicle, in which several convertible seats 1 in accordance with the invention are mounted. In FIG. 5, they are all shown in seat configuration and are mounted so that they can move horizontally (see double arrows) along the rails 20 laid out on the floor 23 of the passenger compartment. FIG. 6 shows the same seats in fold-away flat configuration, and reveals that in this configuration, the seats 1 are completely retracted in the floor 23 of the vehicle, in such a way that the backs 21, 22 of the seats and backrests respectively, make up a flat surface together with the floor 23. In this way a flat floor surface is obtained throughout most of the passenger compartment, which allows the space in the passenger compartment to be used for various applications, such as, particularly, storing especially bulky and/or fragile objects, which require a large, perfectly flat space.

In addition, it can be arranged for the inclination of the seat 2 and the backrest 3 to be adjustable by unlocking and then locking at least one of the joints A14, A19 located on the third 14 and fifth 19 axles respectively. It can also be arranged for the height of the seating surface 2 to be adjustable by unlocking and then locking at least one of the joints of the rigid elements. These layouts have the advantage of grouping together all the adjustments of the height and/or inclination of the seat and the controls to change the configuration on the same axle, which contributes to the simplicity of the structure and use of such a seat.

Figure 7:
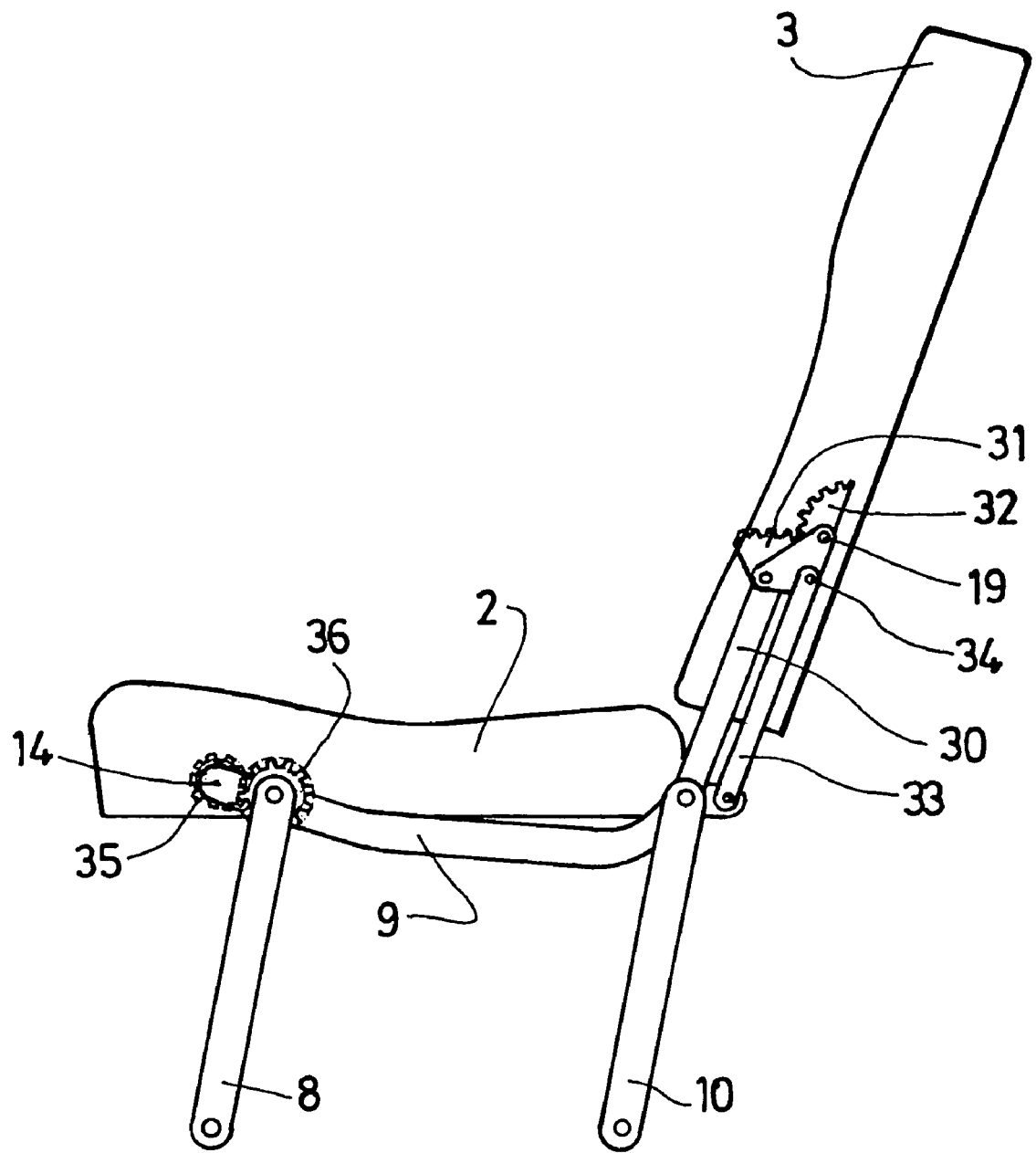
FIG. 7 is a side view of a seat according to one embodiment of the invention, in its seat configuration.

FIG. 7 shows an embodiment in which a rod 30 is lockably mounted on the end and on the extension of element 10. This rod is connected at its open end to the backrest 3 of the seat, and has a cogwheel on this end. The cogwheel 31 engages with a cogwheel 32 mounted interdependently with the backrest on the latter's pivoting axle 19.

Another rod 33 forms a foldable quadrilateral with the rod 30. For this purpose, the rod 33 is connected at one of its ends to the backrest of the seat at a point 34 near the open end of the rod 30 and the axle 19, and at its other end to an extension of the element 9.

In addition, the axle 14 has a cogwheel 35 that is formed integral with the seating surface 2. This cogwheel 35 engages with a cogwheel 36, which is formed integral with the element 8 at the end of the latter.

Figure 8:
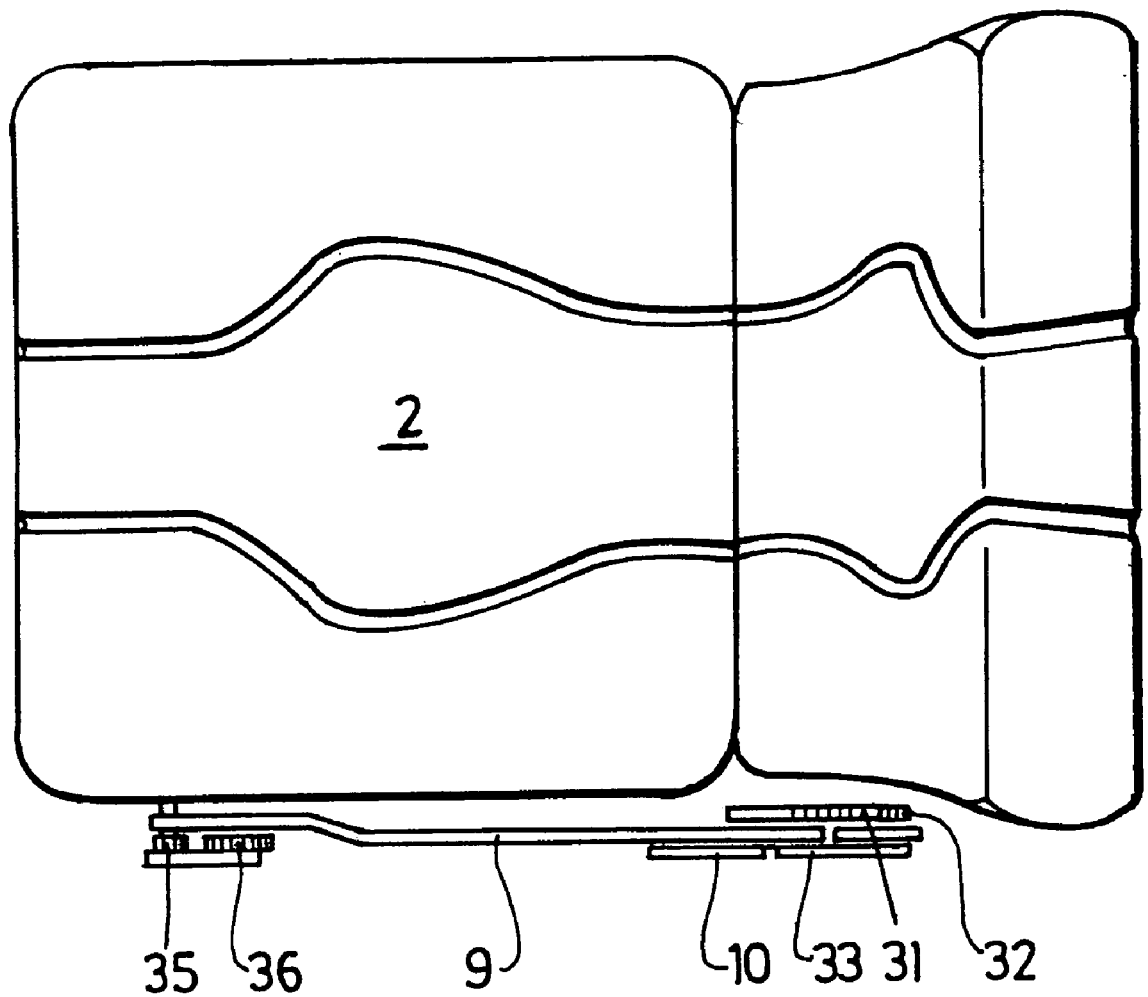
FIG. 8 is a top view.
Figure 13A:
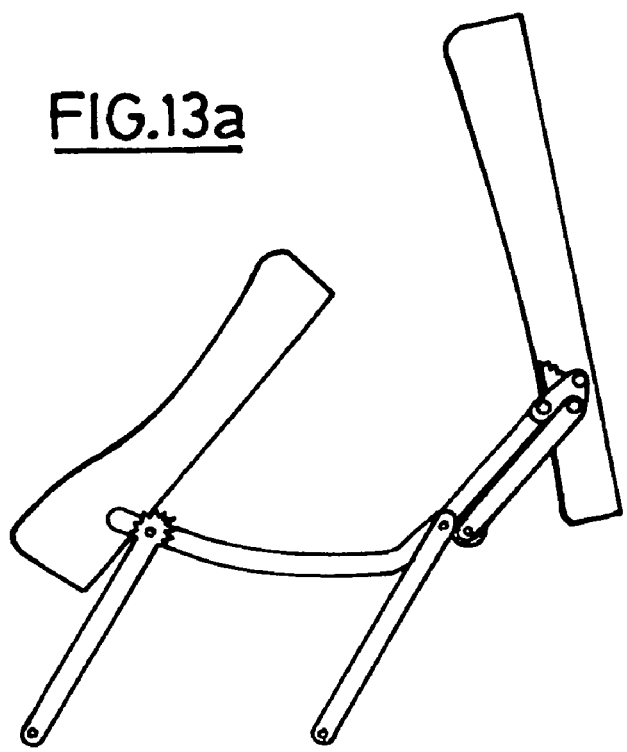
FIGS. 13a, 14a and 15a are side views of the seat in FIGS. 7 and 8, in the process of being folded down and in fold-away flat configuration in the floor of the vehicle (FIG. 15a)
Figure 13B:
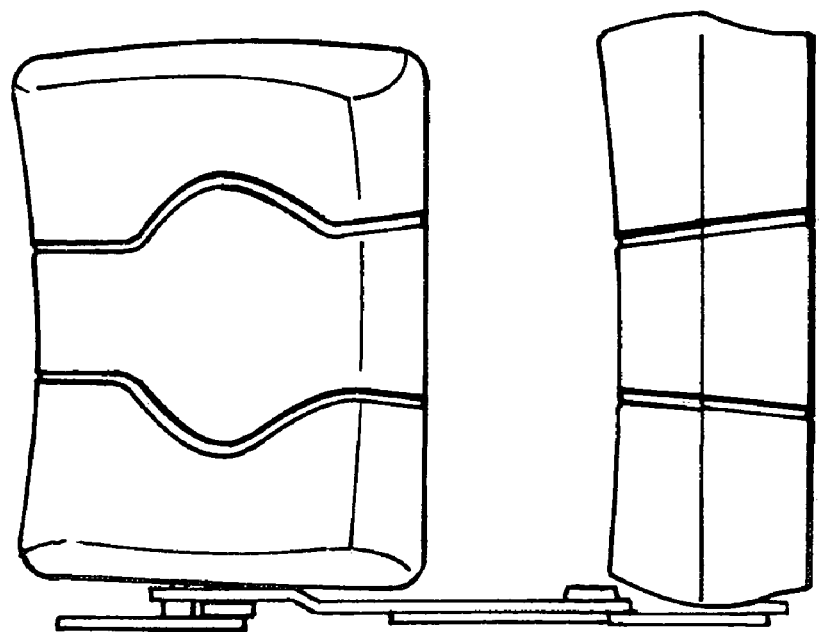
Figure 14A:
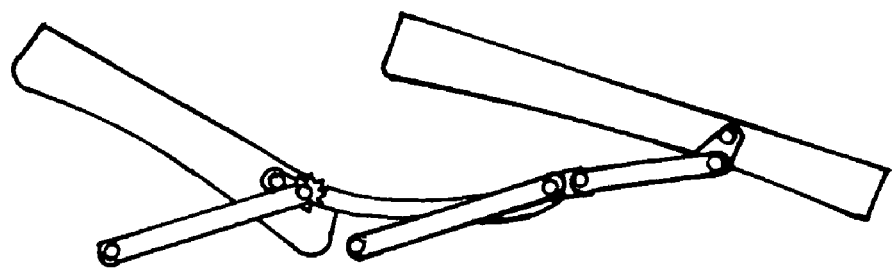
Figure 14B:
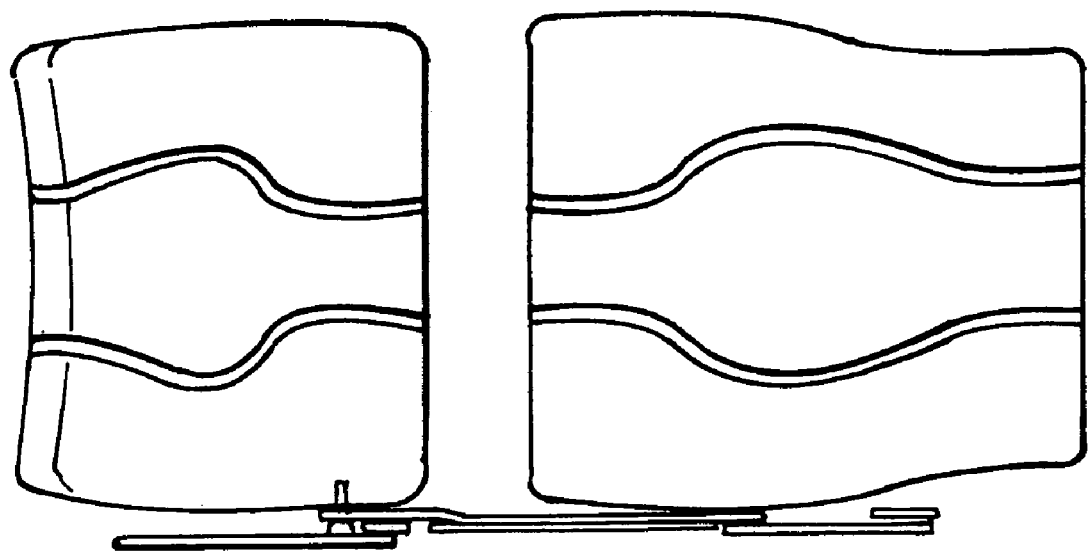
Figure 15A:
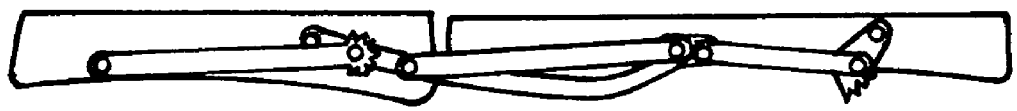
Figure 15B:
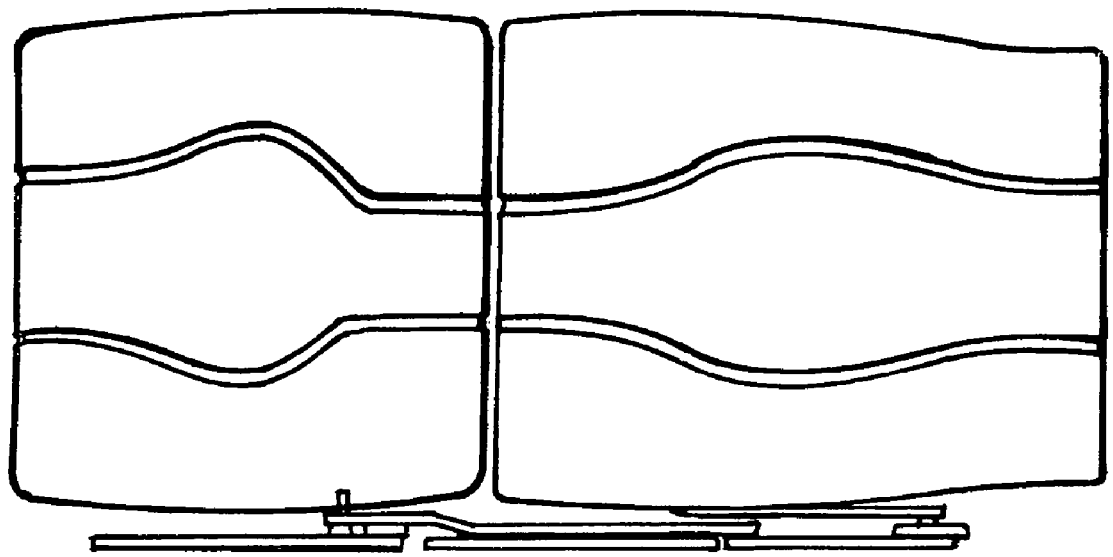

Thus, to convert the seat from its configuration in FIGS. 7 and 8 to its retracted configuration in FIG. 15, passing through the intermediate configurations in FIGS. 13 and 14, it is only necessary to swing the seat upwards around axle 14, or else to swing the backrest upwards around axle 19. The rods and cogwheels cause the other element to swing also.

The invention claimed is:

1. A convertible car seat, comprising:
    a seating surface and a backrest which both run substantially perpendicular to a longitudinal plane (P);
    a support including two frames, which are symmetrical with respect to a defined perpendicular plane (P), which are both quadrilateral in shape and are positioned on either side of the seating surface along planes that are substantially parallel to the plane (P), the sides of the frames being made up of rigid elements, at least one of which is positioned along a plane that is generally horizontal, with the opposite rigid element located on one of the sides of the seating surface, the rigid elements being connected to each other by means of joints positioned at each of opposite ends along an axle and comprising a set of four axles substantially parallel to each other, in such a way that the support can be folded by pivoting the rigid elements around the axles in one direction of rotation on one end of the rigid element and in the same direction of rotation on the other end, the axles comprising the following when the convertible seat is in a seat configuration:
    a first axle that connects the rigid elements located in front of the seat to the substantially horizontal rigid elements,
    a second axle that connects the rigid elements located to the rear of the seat to the substantially horizontal rigid elements,
    a third axle and a fourth axle which connect the rigid elements located in front of the seat and the rigid elements located to the rear of the seat to the rigid elements located on either side of the seat wherein:
    at least one of the joints of the rigid elements is lockable in such a way as to lock the support in a given position,
    the seating surface is mounted lockably connected to the mentioned third axle,
    arms are placed on either side of the seat, along longitudinal planes, with a first end of each arm lockably connected to the fourth axle, and
    the backrest is mounted on the second end of by means of at least one lockable joint to form a fifth axle which is substantially parallel to the other axles, in order to unlock one or more of the lockable joints to enable the support, the seating surface the arms and the backrest to be placed in various positions, and locking one or more of the lockable joints enables the support, the seat, the arms and the backrest of the seat to be fixed in a given configuration.

2. A convertible seat according to claim 1, characterized in that its flat configuration consists of at least two positions:
    one, high, in which the frames open out upwards,
    another, low, in which the frames are folded downwards.

3. A convertible seat according to claim 1, characterized in that the rigid elements located on a horizontal plane are guided along longitudinally parallel rails, which allow the convertible seat to be moved along such rails, and that at least one of the joints located on said horizontal plane is lockable on the mentioned rail.

4. A convertible seat according to claim 1 characterized in that the fourth axle includes means that make it possible to releasably hook the rear part of the seating surface and the bottom part of the backrest to the mentioned axle.

5. A convertible seat according to claim 1 characterized in that at least one of said lockable rigid elements is combined with the lockable joint of the seating surface.

6. A convertible seat according to claim 1 characterized in that the locking/unlocking of at least the joints of the first and second ends of the arms is coordinated.

7. A convertible seat according to claim 6 that characterized in that a series of means are provided in order to make the movements of the backrest and the arms interdependent.

8. A vehicle including at least one seat in accordance with claim 1.

9. A method for transforming a convertible seat according to claim 1 to either the seat, shelf, document case or flat configurations, that characterized in that it includes the successive steps of unlocking one or several of the lockable joints, repositioning the seating surface and/or the backrest, and locking said lockable joint or joints.

10. A method for transforming a convertible seat according to claim 1 from a seat configuration to a shelf configuration that characterized in that it consists of:
    unlocking the joints located on the fourth and fifth axles,
    pivoting the backrest and the arms around the fifth and fourth axles respectively in one direction of rotation on one end of the rigid element and in the same direction of rotation on the other end and, when the back of the backrest is horizontal,
    locking the joints located on the fourth and fifth axles.

11. A method for transforming a convertible seat according to claim 1, from a seat configuration to a flat configuration that characterized in that it consists of:
    unlocking the joints located on the third, fourth and fifth axles,
    pivoting the seating surface around the third axle,
    pivoting the backrest and the arms around the fifth and fourth axles respectively and, when the back of the seating surface and the back of the backrest are on the same horizontal plane,
    locking the joints located on the third, fourth and fifth axles.

12. A method for transforming a convertible seat according to claim 11, from the flat configuration to a fold-away flat configuration that characterized in that it consists of:
    unlocking at least one of the mentioned joints of the rigid elements,
    folding the frames downwards and, when the lowest position is reached, locking at least one of said joints of the rigid elements.

13. A method for transforming a convertible seat according to claim 1, from a seat configuration to a document case configuration that characterized in that it consists of:
   unlocking the joints located on the third and fourth axles,
   detaching the rigid elements in front of the substantially horizontal rigid elements,
   pivoting the seating surface until it is substantially vertical and close to the backrest,
   locking the joints located on the third and fourth axles.

14. A method for transforming a convertible seat according to claim 1 characterized in that the inclination of the seating surface and the backrest can be adjusted by unlocking and then locking at least one of the joints located on the third and fifth axles respectively.

15. A method for transforming a convertible seat according to claim 1 characterized in that the height of the seating surface can be adjusted by unlocking and then locking at least one of the joints of the rigid elements.

16. A convertible seat according to claim 1 characterized in that it includes a first rod substantially located on the extension of at least one of the mentioned rigid elements located to the rear of the seat, where such rod has on its open end a first cogwheel designed to work together with a second cogwheel mounted on the mentioned fifth axle formed integral with the backrest, with a third cogwheel mounted on said third axle formed integral with the seating surface and designed to work together with a fourth cogwheel mounted on the end of the relevant rigid element located in front of the seat, with a second rod connected to the backrest of the seat and to the rigid element located on the relevant side of the seat in such a way that it forms a foldable quadrilateral with the aforementioned first rod.

\* \* \* \* \*